(12) United States Patent
Ramanujan et al.

(10) Patent No.: US 8,799,049 B2
(45) Date of Patent: Aug. 5, 2014

(54) SYSTEM AND METHOD FOR FORECASTING CONTACT VOLUME

(75) Inventors: Sanjay Ramanujan, Chandler, AZ (US); Andrea E. Fisher, Tucson, AZ (US)

(73) Assignee: Intuit Inc., Mountain View, CA (US)

( * ) Notice: Subject to any disclaimer, the term of this patent is extended or adjusted under 35 U.S.C. 154(b) by 1972 days.

(21) Appl. No.: 11/622,345

(22) Filed: Jan. 11, 2007

(65) Prior Publication Data
US 2008/0172286 A1   Jul. 17, 2008

(51) Int. Cl.
*G06Q 10/00* (2012.01)
*G06Q 10/06* (2012.01)

(52) U.S. Cl.
CPC .............................. *G06Q 10/06315* (2013.01)
USPC ........................................ 705/7.22; 705/7.25

(58) Field of Classification Search
CPC ................................................ G06Q 10/06315
USPC ................................................ 705/7.22, 7.25
See application file for complete search history.

(56) References Cited

U.S. PATENT DOCUMENTS

| | | | |
|---|---|---|---|
| 6,275,812 B1 | 8/2001 | Haq et al. | |
| 6,366,666 B2 | 4/2002 | Bengtson et al. | |
| 6,571,215 B1 | 5/2003 | Mahapatro | |
| 6,574,605 B1 | 6/2003 | Sanders et al. | |
| 6,584,191 B1 | 6/2003 | McPartlan et al. | |
| 6,611,726 B1 | 8/2003 | Crosswhite | |
| 6,711,253 B1 | 3/2004 | Prabhaker | |
| 6,985,872 B2 | 1/2006 | Benbassat et al. | |
| 7,103,562 B2 | 9/2006 | Kosiba | |
| 2002/0169657 A1 * | 11/2002 | Singh et al. | 705/10 |
| 2003/0033184 A1 | 2/2003 | Benbassat et al. | |
| 2003/0061088 A1 * | 3/2003 | Sarlay et al. | 705/9 |
| 2003/0065548 A1 * | 4/2003 | Schmidt | 705/9 |
| 2004/0010437 A1 | 1/2004 | Kiran et al. | |
| 2005/0065837 A1 * | 3/2005 | Kosiba et al. | 705/9 |
| 2005/0131747 A1 | 6/2005 | Vigil | |
| 2005/0177414 A1 * | 8/2005 | Priogin et al. | 705/10 |
| 2005/0240465 A1 * | 10/2005 | Kiran et al. | 705/10 |
| 2005/0288993 A1 | 12/2005 | Weng et al. | |
| 2006/0031110 A1 | 2/2006 | Benbassat et al. | |
| 2006/0218278 A1 | 9/2006 | Uyama et al. | |

OTHER PUBLICATIONS

Genesys' Next Generation Workforce Manager Product Now Generally Available. Business Editors/High-Tech Writers ICCM 99. Business Wire. New York: Sep. 1, 1999. p. 1.*
Genesys' Next Generation Workforce Manager Product Now Generally Available. Business Editors/High-Tech Writers ICCM 99. Business Wire. NewYork: Sep. 1, 1999. p. 1.*
Ramunujan, Sanjay and Andrea Fisher, "Forecasting and Planning in an Extremely Seasonal Business—Intuit's Experience," The Journal of Business Forecasting, vol. 25, Issue 3, Fall 2006.
U.S. Appl. No. 11/622,340, filed Jan. 11, 2007.

* cited by examiner

Primary Examiner — Timothy Padot
(74) Attorney, Agent, or Firm — Osha Liang LLP

(57) ABSTRACT

Various embodiments of a planning and execution process used to forecast contact volumes that will occur over the course of a season and determine resources necessary to handle the contact volumes are disclosed. The planning and execution process may be used to determine staffing resources necessary to service contact volumes across a plurality of support channels. The contact volume forecast may be continually updated over the course of the season, and different models may be used to generate the contact volume forecast at different times during the season.

10 Claims, 7 Drawing Sheets

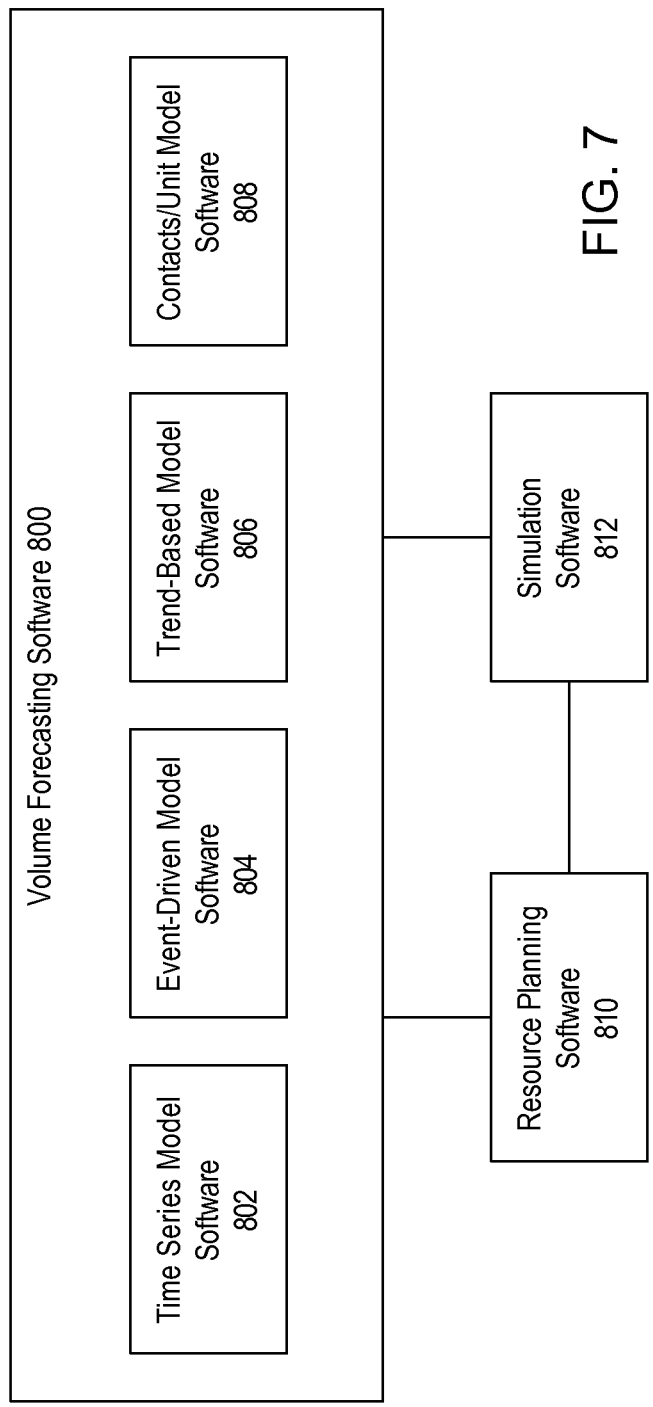

SYSTEM AND METHOD FOR FORECASTING CONTACT VOLUME

BACKGROUND

Many businesses provide support centers to handle customer inquiries for their products or services. Support may be provided across different contact channels, such as telephone, email, electronic chat, etc. The number of customer inquiries per day (or other unit of time) is referred to as the contact volume. In some businesses the contact volume remains fairly constant over the course of a season. In other businesses the contact volume varies significantly at different times during the season.

In a seasonal business in which the contact volume varies throughout the season it is desirable to adjust staffing resources or other resources in accordance with the contact volume. For example, when the contact volume is high it is sometimes desirable to increase the number of support staff in order to provide a satisfactory service experience for customers. When the contact volume is low it is sometimes desirable to decrease the number of support staff in order to decrease staffing expenditures.

In businesses that exhibit a high degree of seasonality or unpredictability in contact volume during the season, planning for resource adjustments over the course of the season is a particularly difficult problem. For example, tax businesses, such as businesses that provide tax software products or other tax products or services, exhibit a high degree of variability in contact volume due to various factors that influence when customers prepare their tax returns. For example, natural disasters or policy changes by the IRS can affect the times at which significant numbers of people prepare their tax returns, and thus change the contact volume seen by a tax business.

SUMMARY

Various embodiments of a system and method for performing contact volume forecasting are disclosed. According to one embodiment of the method, an initial contact volume forecast may be performed at a beginning of a season. The initial contact volume forecast may be performed based on one or more of a plurality of models, e.g., where the plurality of models includes one or more event-driven models and one or more quantitative models. The method may further comprise repeatedly revising the contact volume forecast as the season progresses.

Revising the contact volume forecast may comprise receiving information indicating contact volume data for a recent time period. For each of the plurality of models, contact volume predicted by the model for the recent time period may be determined. A best model which predicted the most accurate contact volume for the recent time period may also be determined. The contact volume forecast may be revised based at least in part on a future contact volume predicted by the best model.

BRIEF DESCRIPTION OF THE DRAWINGS

FIG. 7 illustrates various software tools comprised in the planning and execution software, according to one embodiment.

Figure 1:
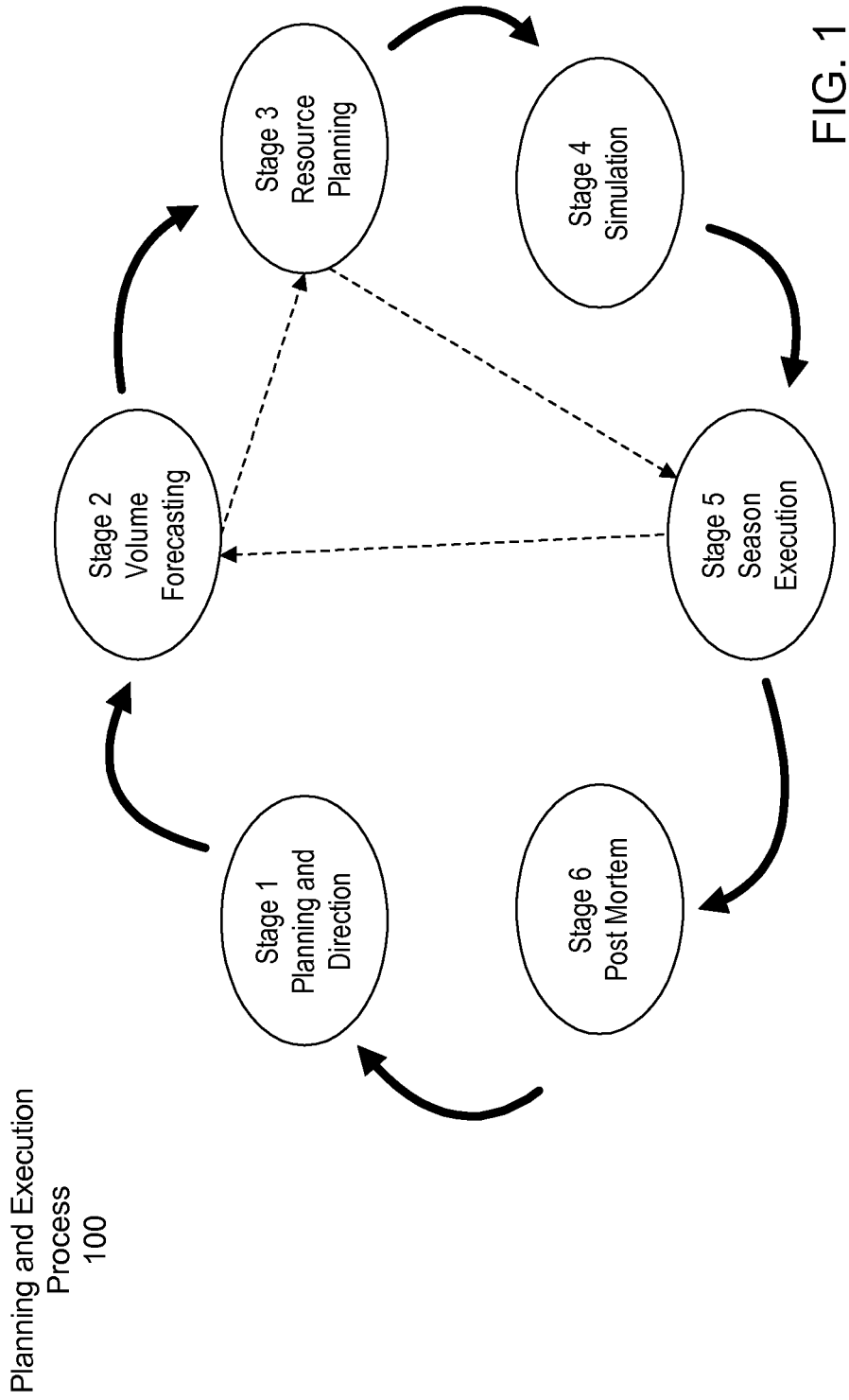
FIG. 1 illustrates a planning and execution process for forecasting contact volumes that will occur over the course of a season and determining resources necessary to handle the contact volumes, according to one embodiment.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 illustrates a planning and execution process 100. Various embodiments of the planning and execution process 100 may be used to forecast contact volumes that will occur over the course of a season and determine resources necessary to handle the contact volumes. For example, in some embodiments the planning and execution process 100 may be used to determine staffing resources necessary to service contact volumes across one or more support channels. As described in detail below, the contact volume forecast may be updated over the course of the season, and different models may be used to generate the contact volume forecast at different times during the season.

In various embodiments, the planning and execution process 100 may be used to forecast contact volumes and plan resources for any of various kinds of seasons. As used herein, a season may refer to any length of time. In one embodiment, the season may be a fiscal year, calendar year, month, a number of days such as 39 days, or other yearly period. However, in other embodiments the season may be a period of time more than a year (e.g., 15 months, 392 days, etc.) or less than a year.

Various embodiments of the planning and execution process 100 may be used for efficiently planning resources necessary to handle contact volumes for any of various types of businesses or business products. As discussed below, some embodiments of the planning and execution process 100 may be applicable to a highly seasonal business in which contact volumes may vary significantly throughout the course of the season, such as a tax business, a business based on a given holiday period (e.g., Valentines Day, Christmas, etc.).

FIG. 1 illustrates an embodiment in which the planning and execution process 100 includes six stages: (1) planning and direction, (2) volume forecasting, (3) resource planning, (4) simulation, (5) season execution, and (6) post mortem. It is noted that FIG. 1 represents an example of a planning and execution process 100, and in various embodiments, some of the stages shown in FIG. 1 may not be performed, or other stages may be performed in addition to those shown.

Stage 1 includes setting strategic objectives and specifying metrics to be used in evaluating performance for an upcoming season. For example, desired customer support service levels may be individually defined for different contact channels, e.g., by specifying desired response times for each contact channel. The planning and direction stage (Stage 1) is typically, but not necessarily, performed at or prior to the beginning of the season.

The volume forecasting stage (Stage 2) includes forecasting or predicting contact volume, e.g., forecasting or predicting the number of customer inquiries that will be received per unit of time over part or all of the season. If multiple contact channels are provided then the anticipated contact volume for each contact channel may be forecast.

In various embodiments the volume forecasting may be performed at different levels of granularity, e.g., for different units of time. For example, in some embodiments the volume forecasting may comprise forecasting or predicting the number of customer inquiries that will be received on a daily basis. In other embodiments the volume forecasting may be performed for greater time periods, e.g., predicting the number of customer inquiries that will be received on a weekly or monthly basis, or the volume forecasting may be performed for smaller time periods, e.g., predicting the number of customer inquiries that will be received on an hourly basis, or over multiple hours or other time period.

In some embodiments the volume forecasting may be performed at multiple levels of granularity. As one example, the volume forecasting may forecast the number of customer inquiries that will be received on a weekly basis and may also forecast contact volume variance within a given week. For example, the volume forecasting may forecast the overall number of customer inquiries that will be received during the week and may also forecast the number of customer inquiries that will be received each day during the week, e.g., where a different number of customer inquiries may be forecast for each day of the week.

At or prior to the beginning of the season, an initial contact volume forecast may be performed. As described below, different kinds of models may be used for the initial contact volume forecast, e.g., depending on whether or not historical data is available for the product or service in question. As the season progresses, the contact volume forecast may be revised. In some embodiments, different models may be used to revise or perform the contact volume forecast at different times during the season, as described in detail below.

The resource planning stage (Stage 3) includes planning the number of resources and/or types of resources required to handle the predicted contact volume over the course of the season. In some embodiments the resource planning stage may include creating a staffing plan, e.g., by planning or determining the number of support staff (people) required to handle the predicted contact volume for each contact channel over the course of the season. In other embodiments the resource planning stage may include planning for other types of resources instead of or in addition to support staff. For example, in one embodiment, computing resources necessary to handle the predicted contact volume for each contact channel may be determined.

In creating a staffing plan or other resource plan, the desired customer service levels specified in the planning and direction stage may be taken into account. One metric frequently used to measure the degree of customer service is service level. Service level, as defined by Incoming Calls Management Institute (ICMI), is "X percent of contacts handled within Y seconds." Prior to creating a staffing plan, an organization may determine the level of service that it plans to provide to customers in terms of the amount of time a customer is expected to wait in queue before receiving an answer. The service level metric may be used as an input for the staffing plan because the level of staff required to handle contacts depends on the amount of time the organization expects customers to wait.

Once the contact volume forecast is established and the service level expectation is set, an appropriate agent (staff) headcount may be determined. In one embodiment the staff planning begins with the creation of a high-level capacity plan which identifies the total number of agents required or desired to handle the volumes. In some embodiments, the plan may identify a required or desired agent headcount for each individual contact channel (e.g., electronic chat, email, and telephone) handled by staffing agents. In one embodiment, the appropriate number of agents is determined based on the following information: average handle time, occupancy, and shrinkage. These factors set the parameters for the amount of actual work time each agent is expected to work on a daily basis.

According to ICMI, average handle time is defined as "the sum of average talk time and average after-call work." This number represents the total amount of time an agent spends on each contact. Talk time accounts for the "time customers are connected with agents" and after-call work consists of "work that is necessitated immediately following an inbound call." (Note that although the definitions refer specifically to inbound telephone contacts, the same calculations apply to electronic contacts.) If historical data is available then these numbers may be derived from actual historical values from one or more prior seasons and adjusted for any process or tool changes planned by the organization which significantly increase or decrease either talk and/or after-call time.

Occupancy is the amount of staff time in which an agent will be engaged in actively handling customer contacts. Occupancy may affect staffing by helping to determine the average speed needed to answer contacts and helping to determine the daily workload of an agent. In order to ensure that contacts are handled within the target service level, a certain percentage of the overall staff must be available at any given time. Otherwise, contacts will build up in a queue, diminishing the ability to respond to contacts within the established service level. Thus, the lower the occupancy is, the higher will be the service level. Accurately forecasting the amount of available time per shift per agent may also be an important factor in agent satisfaction. Based on the occupancy and the amount of time in a shift, the organization may attempt to ensure that agents have a certain amount of time between contacts in order to avoid loss of efficiency or satisfaction in agents.

Shrinkage (also known as the rostered staff factor) refers to the minimum staff required over and above the base staff requirement in achieving a certain service level. In other words, shrinkage is the amount of time per shift an agent spends on activities other than handling contacts. This includes pre-planned activities such as breaks, coaching, and training as well as unplanned activities such as absence, vacation allotments, and project time. For forecasting the appropriate amount of time for value-added actions, non-contact activities may be considered as part of the staff planning process. The overall headcount numbers should be large enough to cover the time spent on shrinkage.

In various embodiments the staffing plan or other resource plan may specify the number of staffing agents or other resources required throughout the season at different levels of time granularity, e.g., on a daily basis, weekly basis, monthly basis or other time unit basis. For example, in one embodiment the staffing plan may specify the number of staffing agents required for each week in the season. Thus, the average handle time, occupancy, and shrinkage factors may be forecast for each week in the season, based on the weekly contact volume forecast.

Once the average handle time, occupancy, and shrinkage factors have been forecasted on the weekly (or other time unit) level, the required agent headcount per week may be established. In one embodiment a ramp plan may then be created. For example, in order to have the appropriate number of staff on hand per week, a staff training schedule may be created with two objectives in mind. The first objective is to stagger the new-hire classes of each training location to allow for reasonable recruitment time for the agent pool. The second objective for the ramp plan is to graduate the new-hire classes. The number of agents needs to be in line with the rising forecast volumes. If there is a sharp rise in contacts, a significant number of concurrent training classes may be arranged across all training locations. This can put a strain on available resources, which includes recruiting, training room availability, and qualified trainers. The ramp plan may be created so as to balance the incremental cost of early ramp (low occupancy and overstaffing) with the incremental benefit.

Creating the staffing plan may also include determining agent schedules. For example, the contact volume forecast may be broken down into half-hour interval projections, and the agent schedules may be specified at this level. In one embodiment, historical half-hourly interval patterns may be used to determine the granular level contact volume forecasts. The staffing plans may then be validated at the interval level by using workforce management software.

At or prior to the beginning of the season, an initial staffing plan or other resource plan may be created, as described above. As the contact volume forecast is revised over the course of the season, the staffing plan or other resource plan may be updated accordingly, e.g., to reflect newly forecast variations in the contact volume.

The simulation stage (Stage 4) may include performing a simulation of the season based on the staffing plan (or other resource plan) and the predicted contact volume. For example, a simulation software tool may perform a simulation in order to obtain accurate estimates of variables such as the service level, abandon rate, and the wait times that an average customer would experience during different parts of the season. Simulations typically help answering questions such as: What would be the impact of different volume forecasts and average handle-time variance on staffing needs and service levels? When a backlog of email cases occurs, how many days and resources would be necessary to work through the backlog? In terms of speed, what would be the level of customer service when responding to queries, and what would be the maximum delay that could occur during the peak volume time? What would be the impact if dedicated team were created to handle the main contact volume? How can the contact channel mix be optimized while staying within the budget? Performing the simulation may help in the understanding of the impact of multivariable interactions in the contact center environment.

The season execution stage (Stage 5) is when the customer inquiries are received and serviced by the organization. As described in detail below, the contact volume forecast and the resource plan may be revised as the season gets under way and may also be revised over the course of the season, where different models may be used at different times in the season.

For example, at a given point in the season, the contact volume forecast and resource plan may be revised based on the actual contact volume patterns experienced thus far during the season. Thus, as indicated in FIG. 1 by the dashed arrows between Stages 2, 3, and 5, the volume forecasting and resource planning may be performed in an iterative manner over the course of the season.

In one embodiment, the organization may establish a Local Command Center to oversee support operations across multiple websites or physical locations, as well as to manage multiple contact channels. Command Center Coordinators may be responsible for monitoring actual contact volume versus forecast contact volume, as well as staffing for each contact channel, location, etc.

The Local Command Center may have the ability to direct and control customer contact inquiries. For example, the Local Command Center may give accurate wait time estimates and, when necessary, may direct customers to alternate contact channels for better service. In addition, the Local Command Center may have the ability to close or re-staff contact channels that are performing sub-optimally. The Local Command Center may also redirect customer inquiries and resources to other channels during peak intervals.

The Local Command Center may also perform real-time staff management. For example, the Local Command Center may be able to manage the movement of staffing agents between different contact channels in order to achieve a high level of customer service. During the resource planning stage, contingency plans that outline the optimum locations and channels for agent movement in high volume/heavy shrinkage areas may be created.

In addition to resource shifting, the Local Command Center may also be able to reschedule breaks and lunches, cancel scheduled shrinkage (training, coaching, etc.), request overtime, and change agent schedules as needed. These actions may be taken when pre-defined triggers are reached.

The post mortem stage (Stage 6) includes measuring customer satisfaction, e.g., through post-contact surveys. For example, a survey may be sent by email to a customer at some time after a contact to evaluate the performance of the contact center. Customer satisfaction may be taken account in the planning stages in order to ensure loyalty and future growth.

Figure 2:
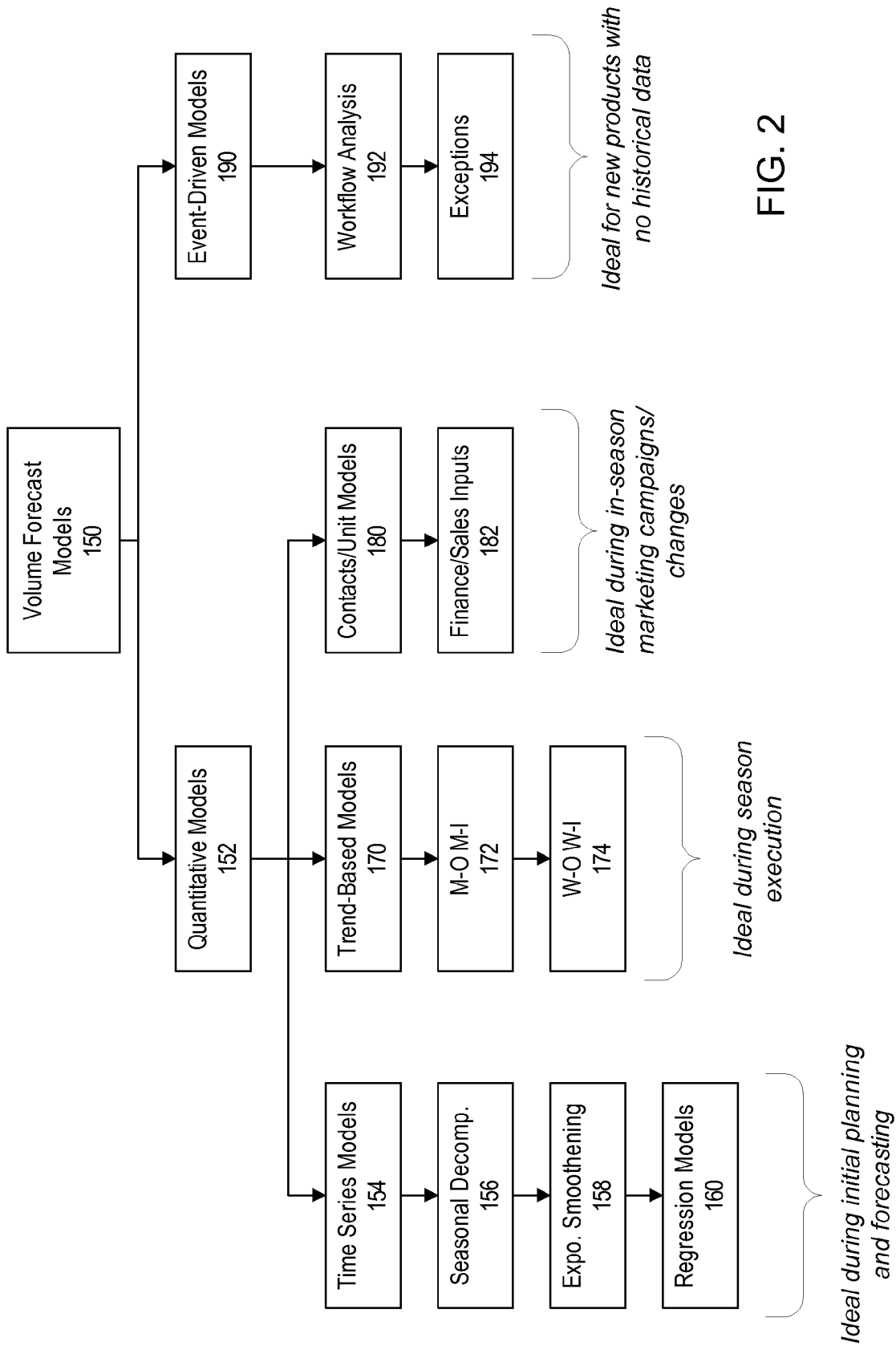
FIG. 2 illustrates a plurality of volume forecast models that may be used in the planning and execution process, according to one embodiment.

As noted above, the contact volume forecast may be performed or revised based on different types of models or combinations of models at different times during the season. FIG. 2 illustrates a plurality of volume forecast models 150 that may be selected from, including various types of quantitative models 152 as well as event-driven models 190.

The quantitative models 152 include time series models 154. As indicated in FIG. 2, the time series models 154 may be particularly useful during the initial planning and contact volume forecasting for products or services for which historical contact volume data is available from previous seasons. Thus, a time series model 154 may typically be used in performing the initial volume forecast for such a product. However, as the season progresses, more accurate volume forecasts may often be obtained based on another type of volume forecast model. For example, the volume forecast may be revised based on a volume forecast model such as a trend-based model 170 and/or a contacts/unit model 180, which are driven by various types of changes that occur as the season progresses. For example, if the business is highly seasonal or has unpredictable contact volumes, e.g., as in a tax-related business, then a trend-based model 170 or a contacts/unit model 180 may help to better account for the seasonality.

Trend-based models 170 are volume forecast models that are based on actual contact patterns exhibited by customers during the season. For example, in a tax-related business, various types of events that affect customer tax filing behavior (and thus affect how/when customers contact the support center for the tax-related business) may occur during the season, such as natural disasters or policy changes by the IRS. As another example, in a given year, people may begin to receive their W-2 forms earlier and may thus prepare their tax returns earlier, or improvements in technology may lead a greater percentage of people to file their taxes electronically, thus altering the time and/or type of customer inquiries within the season. A trend-based model may take into account the "real-time" customer contact patterns seen during the season and adjust the contact volume forecast accordingly. Various types of trend-based models 170 may be utilized, such as M-O M-I models 172 and/or W-O W-I models 174.

Contacts/unit models 180 are volume forecast models that are based on financial/sales inputs 182, such as financial information, sales information, or marketing information expected to have a significant impact on upcoming contact volume levels. For example, if sales of 100,000 units were initially expected, but a new contract is signed that will significantly increase the number of units sold then the updated sales figures may be used as input to a contacts/unit model in order to factor the expected increase in contact volume into the forecast.

For new products or services for which no historical contact volume data is available, an event-driven model 190 may be utilized. An event-driven model 190 may perform a workflow analysis 192 in order to identify possible exceptions or problems 194 that can occur during a customer's interaction with a product that may cause the customer to contact the support center. Event-driven models 190 are discussed below with reference to FIG. 4.

In some embodiments the contact volume forecast may be calculated based on a combination of different types of models. As one example, the initial contact volume forecast may be calculated using a time series model 154 based on historical contact volume data from previous seasons, and the initial volume forecast may be refined based on a contacts/unit model 180 that accounts for expected sales changes that will have a significant impact on the contact volume for the upcoming season. As another example, a trend-based model 170 may be used to update the contact volume forecast during the season, where the results of the trend-based model 170 are combined with results of a contacts/unit model 180 that takes into account sales and marketing events that occur during the season.

Referring again to the time series models 154, in various embodiments any of various types of time series models 154 may be used, such as seasonal decomposition models 156, exponential smoothing models 158 (such as Winter's), and/or regression models 160. Seasonal decomposition models 156 may be particularly applicable for a seasonal business because they capture the seasonality in the business. In one embodiment, at least five years of historical data are used to estimate the seasonal decomposition index for each month. Before loading data into a model, each year's data may be scrubbed to remove outliers that influence demand in each contact channel. For example, if the electronic chat channel was not promoted in a given year but was heavily promoted the next year, then these data need to be normalized. As another example, a high abandon rate (the percentage of callers who are disconnected before reaching an agent) in the telephone contact channel in one particular year influences true demand, which requires adjustments. Hence, data cleansing may be performed before inputting the data into a statistical software package.

Time series models 154 may provide a good monthly volume distribution curve using, e.g., five years of historical data after being scrubbed for outliers. Using this curve, each month is assigned an index proportional to the volumes received in that time. Estimates from marketing projections on sales and associated contacts may then be factored in these months. The monthly volumes may then be broken down into weekly and daily volume estimates that are used for staffing and scheduling purposes. In addition to these approaches, the contacts received per unit sale may also be estimated. This allows for incremental contact volume changes to be factored in if the unit sales projections are to change in the season.

Figure 3:
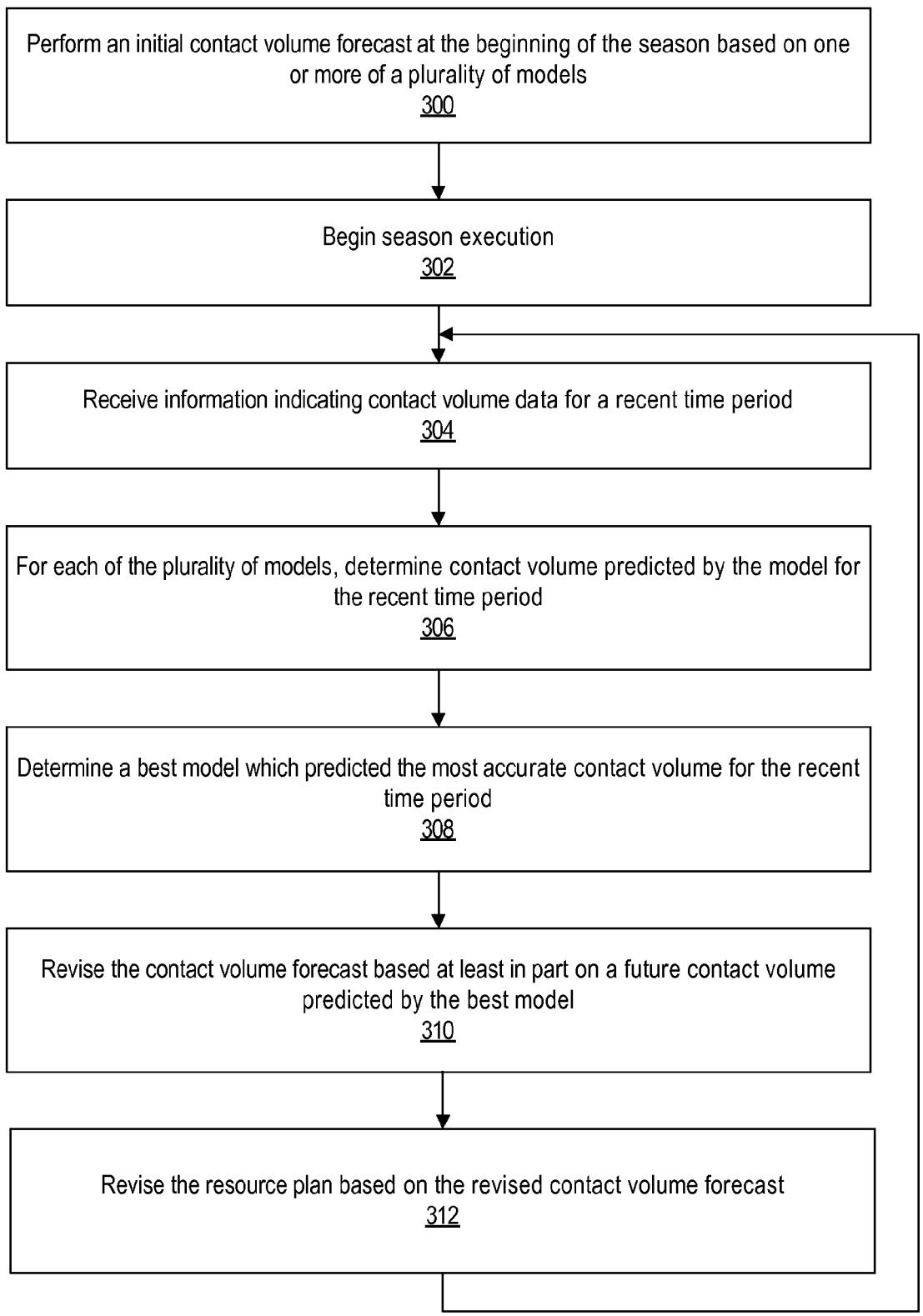
FIG. 3 is a flowchart diagram illustrating one embodiment of a method for performing contact volume forecasting for a product or service, where the contact volume forecast is periodically revised over the course of a season, according to one embodiment.

FIG. 3 is a flowchart diagram illustrating one embodiment of a method for performing contact volume forecasting for a product or service, where the contact volume forecast is periodically revised over the course of a season.

In 300, an initial contact volume forecast may be performed at the beginning of the season, as described above. The initial contact volume forecast may be calculated based on one or more of a plurality of volume forecast models, e.g., such as those illustrated in FIG. 2. For example, in one embodiment, if historical contact volume data from previous seasons is available for the product or service then the initial contact volume forecast may be calculated based on a time series model 154. Otherwise, the initial contact volume forecast may be calculated based on an event-driven model 190. In some embodiments the initial contact volume forecast may be calculated based on both the time series model 154 (or event-driven model 190) and a contacts/unit model 180, as noted above.

In 302, the season execution begins, e.g., when customers begin to contact the support center for the product or service through various contact channels. Once the season execution begins, the contact volume forecast may be periodically (or periodically) revised over the course of the season, as indicated in blocks 304-312.

In 304, information indicating actual contact volume data experienced during a recent time period may be received. For example, the organization may track and compile information indicating how many customer inquiries are received per day (or per other time unit) for a plurality of different contact channels.

As indicated in 306, for each of the plurality of volume forecast models, the contact volume predicted by the model for the recent time period may be calculated. In 308, a current "best" model may be determined, e.g., by determining which of the models predicted the most accurate contact volume for the recent time period. As indicated in 310, the contact volume forecast may then be revised based at least in part on a future contact volume predicted by the best model determined in 308. As described above and indicated in 312, the staffing plan or other resource plan may also be revised accordingly in order to reflect any changes in the projected contact volume.

Similarly as for the initial contact volume forecast, in some embodiments the revised contact volume forecast may also be based on a combination of volume forecast models. For example, block 308 may determine that a trend-based model 170 is currently the "best" model, but if it is known that a sales or marketing event has recently occurred that is expected to influence future contact volume levels then the results of the trend-based model 170 may be combined with results of a contacts/unit model 180 so that the impact of the sales or marketing event is factored into the revised contact volume forecast.

As indicated by the flowchart arrow returning from block 312 to block 304, the contact volume forecast and resource plan may be repeatedly revised as described above. Thus, each time the contact volume forecast is revised, the volume forecast model, or combination of models, that is currently yielding the most accurate contact volume predictions may be used to forecast the expected contact volume going forward. Thus, in some embodiments the method of FIG. 3 may be applicable to seasonal businesses in which contact volume fluctuates or is unpredictable, e.g., by flexibly adopting whichever volume forecast models yield the most accurate forecast at given times during a season of changing patterns in customer inquiries. For example, in one embodiment the method of FIG. 3 may be applicable to forecasting contact volume levels for a tax software product or other software product with highly seasonal contact volume.

In various embodiments, blocks 304-312 may be performed any number of times during the season and at any desired times or time interval. For example, in various embodiments it may be desirable to revise the contact volume forecast and resource plan on a monthly basis, weekly basis, daily basis, and/or intra-day basis. Also, in various embodiments, any desired time window may be considered as the recent time period in blocks 304-308, such as the past day, past week, past month, etc.

As noted above, for new products or services for which no historical contact volume data is available, an event-driven model 190 similar to a Delphi model may be utilized. The event-driven model 190 may analyze a customer's interaction with a product or service in order to identify possible exceptions or problems that can occur that may cause the customer to contact the support center.

Figure 4:
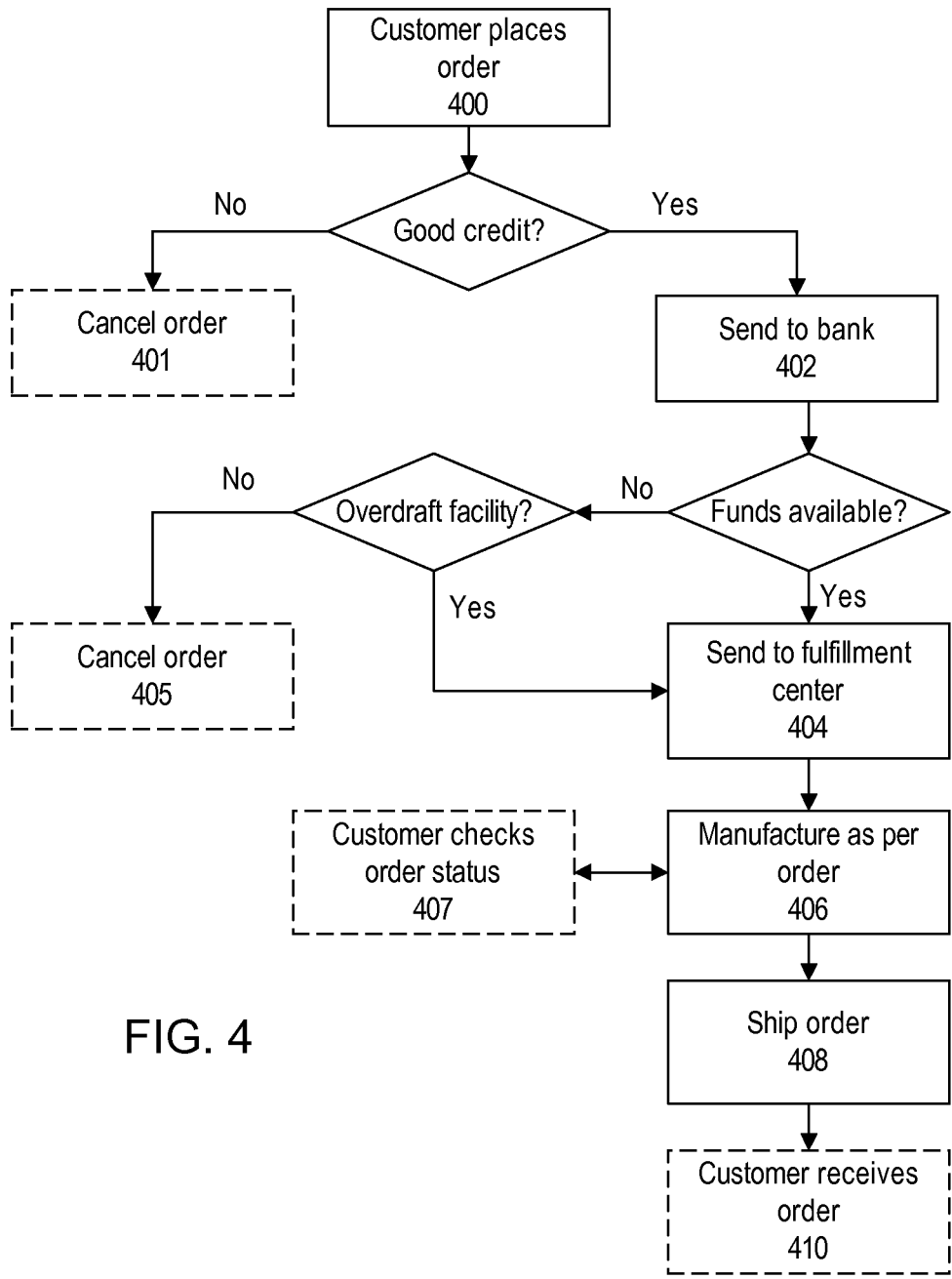
FIG. 4 illustrates an exemplary workflow for an electronic order process, which may be analyzed in an event-driven volume forecast model, according to one embodiment.

For example, FIG. 4 illustrates an exemplary workflow for an electronic order process in which a customer orders a product online. The blocks with dashed borders indicate points in the workflow when customers are likely to contact the support center.

In 400, a customer places an order for a product. The customer's credit may be electronically checked. If the customer's credit is not good then the order may be canceled in 401, which may lead the customer to contact the support center. If the customer's credit is good then the order may be sent to the bank in 402. The customer's funds may be electronically checked. If sufficient funds are not available and the customer does not have an overdraft facility in place then the order may be canceled in 405 which again may lead the customer to contact the support center. Otherwise the order may be sent to the fulfillment center in 404. In 406, the product may be manufactured as per the customer's order. During this time, the customer may contact the support center to check the status of the order, as shown in 407. Once the product has been manufactured, it may be sent to the customer in 408. When the customer receives the order in 410, the customer may contact the support center regarding returns, exchanges, or other questions about the product.

Thus, the workflow shown in FIG. 4 identifies several points in the order process when customers may contact the support center. The workflow may thus be analyzed to forecast the contact volume levels expected for the product.

Figure 5:
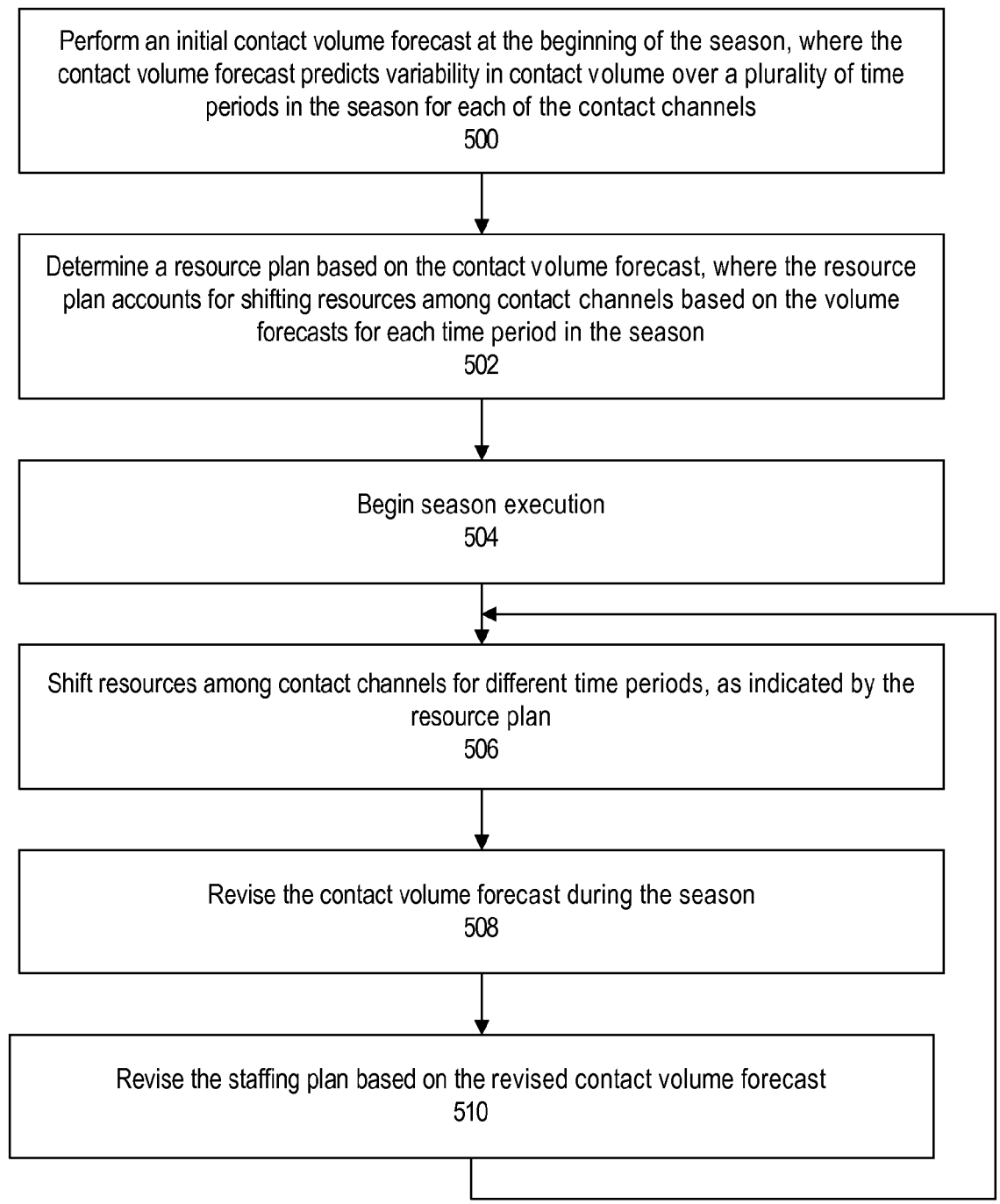
FIG. 5 is a flowchart diagram illustrating one embodiment of a method for creating a resource plan that accounts for variations in contact volume levels for a plurality of contact channels.

For some types of products or services, the relative contact volume levels for different contact channels (e.g., telephone, email, electronic chat, etc.) may vary with respect to each other over the course of the season. FIG. 5 is a flowchart diagram illustrating one embodiment of a method for creating a resource plan that accounts for these variations in contact volume levels for the various contact channels.

In 500, an initial contact volume forecast may be performed at the beginning of the season, similarly as described above. The initial contact volume forecast may predict variability in contact volume over a plurality of time periods (e.g., hours, days, weeks, months, etc.) in the season for each of the contact channels.

In 502, a resource plan, e.g., staffing plan or other resource plan, may be determined based on the contact volume forecast. The resource plan may account for shifting resources among the contact channels based on the volume forecasts for each time period in the season. For example, the resource plan may indicate an amount of resources (e.g., staffing agents, computing resources, or other resources) required for each contact channel for each of the plurality of time periods in the season. For at least one of the time periods, the resource plan may specify that resources are to be shifted into a particular contact channel from one or more other contact channels.

As an example, suppose that the initial contact volume forecast indicates that during Week 10 of the season, a telephone contact channel is expected to have an average of 2,000 inquiries per day, and an email contact channel is expected to have an average of 5,000 inquiries per day. Suppose also that during Week 12 of the season the telephone contact channel is expected to have an average of 3,500 inquiries per day, and the email contact channel is expected to have an average of 3,000 inquiries per day. Thus, since the expected contact volume for the telephone contact channel has increased relative to the expected contact volume for the email contact channel, the staffing plan may take the relative change into account by specifying that a portion of the support agents assigned to the email contact channel should be shifted to the telephone contact channel between Weeks 10 and 12.

Referring again to FIG. 3, in 504 the season execution begins. As indicated in 506, resources (e.g., staffing agents or other resources) may be shifted among contact channels for different time periods, as specified by the resource plan. Thus, the resource plan may anticipate relative changes that will occur across different contact channels over the course of the season and proactively account for these changes by re-assigning resources across the channels in order to efficiently serve the customer inquiries for each contact channel.

As described above and shown in 508, the contact volume forecast may be revised at various times during the season. If the revised contact volume forecast changes the projected contact volume levels for the various contact channels then the staffing plan may be revised based on the revised contact volume forecast, as indicated in 510.

Figure 6:
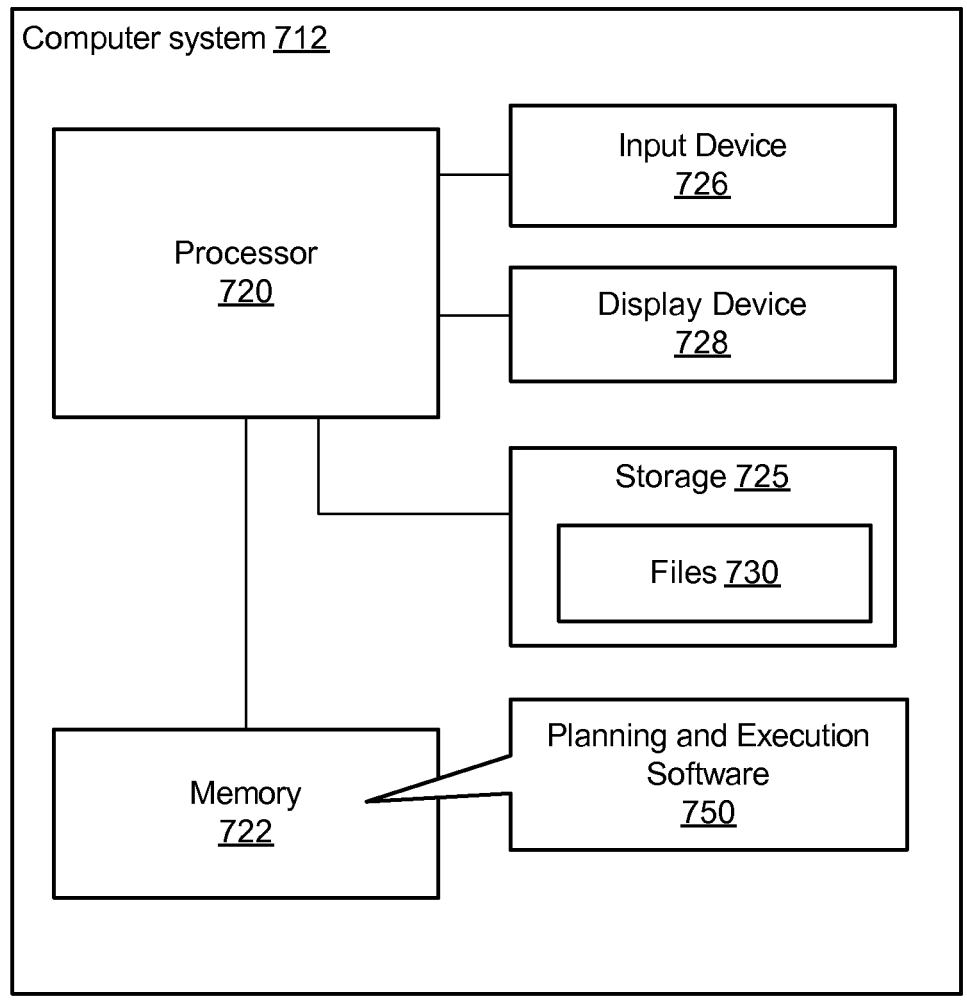
FIG. 6 illustrates an exemplary computer system that executes planning and execution software, according to one embodiment.

In some embodiments the methods described above may be facilitated through the use of software. FIG. 6 illustrates an exemplary computer system that executes planning and execution software 750 that operates to perform various aspects of the above-described methods.

The computer system 712 includes a processor 720 coupled to a memory 722. In some embodiments, the memory 722 may include one or more forms of random access memory (RAM) such as dynamic RAM (DRAM) or synchronous DRAM (SDRAM). However, in other embodiments, the memory 722 may include any other type of memory instead or in addition. The memory 722 may be configured to store program instructions and/or data. In particular, the memory 722 may store planning and execution software 750, which is described below with reference to FIG. 7.

The processor 720 may be configured to execute the planning and execution software 750 stored in the memory 722. It is noted that the processor 720 is representative of any type of processor. For example, in one embodiment, the processor 720 may be compatible with the x86 architecture, while in another embodiment the processor 720 may be compatible with the SPARC™ family of processors. Also, in one embodiment the computer system 712 may include multiple processors 720.

The computer system 712 also includes one or more input devices 726 for receiving user input from a user of the client computer system 712. The input device(s) 726 may include any of various types of input devices, such as keyboards, keypads, microphones, or pointing devices (e.g., a mouse or trackball).

The computer system 712 also includes one or more output devices 728 for displaying output to the user. The output device(s) 728 may include any of various types of output devices, such as LCD screens or monitors, CRT monitors, etc.

The computer system 712 also includes storage 725, e.g., one or more storage devices configured to store files 730 in a stable or non-volatile manner. In various embodiments the storage 725 may include any of various kinds of storage devices, such as optical storage devices or storage devices that utilize magnetic media, e.g., one or more hard drives or tape drives. In one embodiment, the storage 725 may be implemented as one or more hard disks configured as a disk storage system. In one embodiment, the disk storage system may be an example of a redundant array of inexpensive disks (RAID) system. In another embodiment, the disk storage system may be a disk array, or Just a Bunch Of Disks (JBOD), (used to refer to disks that are not configured according to RAID). In yet other embodiments, the storage 725 may include RAM disks, for example.

As noted above, in various embodiments the planning and execution software 750 may perform or aid performance of various aspects of the methods described above. For example, in one embodiment the planning and execution software 750 may include volume forecasting software 800 that performs or aids performance of the volume forecasting described above with reference to FIG. 3. In some embodiments the volume forecasting software 800 may include software tools that implement one or more of the volume forecast models described above.

For example, in the embodiment illustrated in FIG. 7 the volume forecasting software 800 includes time series model software 802 that calculates a volume forecast based on a time series model 154. The time series model software 802 may receive as input historical contact volume data and may generate a contact volume forecast based on the historical contact volume data.

In one embodiment the volume forecasting software 800 may also or may alternatively include event-driven model software 804 that calculates a volume forecast based on an event-driven model 190. The event-driven model software 804 may receive as input information that describes a workflow and points within the workflow where a customer may experience problems requiring customer support. The event-driven model software 804 may generate a contact volume forecast based on the workflow and possibly based on other information, such as expected numbers of unit sales.

In one embodiment the volume forecasting software 800 may also or may alternatively include trend-based model software 806 that calculates a volume forecast based on a trend-based model 170. The trend-based model software 806 may receive as input information that describes real time trends seen in contact volume levels during the season and may generate a contact volume forecast based on the input data.

In one embodiment the volume forecasting software 800 may also or may alternatively include contacts/unit model software 808 that calculates a volume forecast based on a contacts/unit model 180. The contacts/unit model software 808 may receive as input financial, sales, or marketing information expected to impact contact volume levels and may generate a contact volume forecast based on the input data.

In one embodiment the planning and execution software 750 may also include simulation software 812 that executes to perform a simulation of the season based on the staffing plan (or other resource plan) and the contact volume forecast, as described above with reference to Stage 4 of FIG. 1.

In one embodiment the planning and execution software 750 may also include resource planning software 810. The resource planning software 810 may receive as input information describing the contact volume forecast and information specifying desired customer service levels and may generate a resource plan that indicates how resources can be allocated across various contact channels in order to achieve the desired customer service levels.

In some embodiments, output from various of the software modules illustrated in FIG. 7 may be used as input to other software modules. As one example, in one embodiment the time series model software 802 may generate volume forecast output that is received as input by the simulation software 812 and/or received as input by the resource planning software 810.

It is noted that FIG. 7 is an example only, and in various embodiments the planning and execution software 750 may include or be organized into any of various kinds of software modules. Also, in some embodiments the planning and execution software 750 may be distributed across and may execute on multiple computer systems, e.g., where a first portion of the planning and execution software 750 executing on a first computer system produces output that is sent to a second computer system and used as input to a second portion of the planning and execution software 750 executing on the second computer system.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method to perform contact volume forecasting for a tax software support center, the method comprising:

performing, by a computer processor, an initial contact volume forecast for a tax season using a time series model based on historical contact volume from previous tax seasons, wherein the tax season begins on a predetermined date for receipt of tax forms and the tax season ends on a deadline set by a tax authority; and revising, by the computer processor, the initial contact volume forecast during the tax season, wherein revising the initial contact volume forecast comprises:
receiving information indicating contact volume data for a pre-determined historic time period;
determining a first predicted contact volume using the time series model for the pre-determined historic time period;
determining a second predicted contact volume using a trend-based model for the pre-determined historic time period based on a trend of receiving W-2 forms by taxpayers;
determining the trend-based model as predicting a most accurate contact volume for the pre-determined historic time period by at least comparing the first predicted contact volume, the second predicted contact volume, and information indicating the contact volume for the pre-determined historic time period; and
revising the initial contact volume forecast based at least in part on a future contact volume predicted by the trend-based model.

2. The method of claim 1, wherein said revising the initial contact volume forecast as the tax season progresses is performed on at least one selected from a group consisting of a daily basis, a weekly basis, and a monthly basis.

3. The method of claim 1, further comprising:
determining initial staffing requirements based on the initial contact volume forecast;
wherein said revising the initial contact volume forecast comprises revising the staffing requirements based on a revised contact volume forecast.

4. The method of claim 1,
wherein said performing the initial contact volume forecast comprises performing an individual contact volume forecast for each of a plurality of contact channels, and
wherein said revising the initial contact volume forecast comprises revising the individual contact volume forecast for each of the plurality of contact channels.

5. The method of claim 4, wherein the plurality of contact channels include two or more of: a telephone contact channel, an email contact channel, and an electronic chat contact channel.

6. A system to perform contact volume forecasting for a tax software support center, the system comprising:
a memory storing program instructions;
a processor coupled to the memory, wherein the processor is operable to execute the program instructions to implement:
performing an initial contact volume forecast for a tax season using a time series model based on historical contact volume from previous tax seasons, wherein the tax season begins on a predetermined date for receipt of tax forms and the tax season ends on a tax deadline set by a tax authority; and
revising the initial contact volume forecast during the tax season, wherein revising the initial contact volume forecast comprises:
receiving information indicating contact volume data for a pre-determined historic time period;
determining a first predicted contact volume using the time series model for the pre-determined historic time period;
determining a second predicted contact volume using a trend-based model for the pre-determined historic time period based on a trend of receiving W-2 forms by taxpayers;
determining the trend-based model as predicting a most accurate contact volume for the pre-determined historic time period by at least comparing the first predicted contact volume, the second predicted contact volume, and information indicating the contact volume data for the pre-determined historic time period; and
revising the initial contact volume forecast based at least in part on a future contact volume predicted by the trend-based model.

7. The system of claim 6, wherein said revising the initial contact volume forecast as the tax season progresses is performed on at least one selected from a group consisting of a daily basis, a weekly basis, and a monthly basis.

8. The system of claim 6, further comprising:
determining initial staffing requirements based on the initial contact volume forecast;
wherein said revising the initial contact volume forecast comprises revising the staffing requirements based on a revised contact volume forecast.

9. The system of claim 6,
wherein said performing the initial contact volume forecast comprises performing an individual contact volume forecast for each of a plurality of contact channels, and
wherein said revising the initial contact volume forecast comprises revising the individual contact volume forecast for each of the plurality of contact channels.

10. A non-transitory computer-readable medium comprising program instructions to perform contact volume forecasting for a tax software support center, the program instructions executable to:
perform an initial contact volume forecast for a tax season using a time series model based on historical contact volume from previous tax seasons, wherein the tax season begins on a predetermined date for receipt of tax forms and the tax season ends on a tax deadline set by a tax authority; and
revise the initial contact volume forecast during the tax season, wherein revising the initial contact volume forecast comprises:
receiving information indicating contact volume data for a pre-determined historic time period;
determining a first predicted contact volume using the time series model for the pre-determined historic time period;
determining a second predicted contact volume using a trend-based model for the pre-determined historic time period based on a trend of receiving W-2 forms by taxpayers;
determining the trend-based model as predicting a most accurate contact volume for the pre-determined historic time period by at least comparing the first predicted contact volume, the second predicted contact volume, and information indicating the contact volume data for the pre-determined historic time period; and
revising the initial contact volume forecast based at least in part on a future contact volume predicted by the trend-based model.

* * * * *